(12) United States Patent
Al-Hudaifah et al.

(10) Patent No.: US 11,976,549 B2
(45) Date of Patent: May 7, 2024

(54) MONITORING TEMPERATURES OF A PROCESS HEATER

(71) Applicant: Saudi Arabian Oil Company, Dhahran (SA)

(72) Inventors: Abdulaziz A. Al-Hudaifah, Dhahran (SA); Faris Al-Jebali, Al-Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 849 days.

(21) Appl. No.: 17/027,372

(22) Filed: Sep. 21, 2020

(65) Prior Publication Data

US 2022/0090489 A1   Mar. 24, 2022

(51) Int. Cl.
| | |
|---|---|
| *E21B 47/07* | (2012.01) |
| *G01J 5/00* | (2022.01) |
| *G01J 5/02* | (2022.01) |
| *G01J 5/04* | (2006.01) |
| *G01J 5/0875* | (2022.01) |
| *H04N 5/33* | (2023.01) |

(52) U.S. Cl.
CPC ............ *E21B 47/07* (2020.05); *G01J 5/0044* (2013.01); *G01J 5/026* (2013.01); *G01J 5/041* (2013.01); *G01J 5/042* (2013.01); *G01J 5/0875* (2013.01); *H04N 5/33* (2013.01); *G01J 2005/0077* (2013.01)

(58) Field of Classification Search
None
See application file for complete search history.

(56) References Cited

U.S. PATENT DOCUMENTS

| 4,836,689 A | * | 6/1989 | O'Brien | G01J 5/0818 |
| | | | | 359/509 |
| 5,089,238 A | * | 2/1992 | Araki | C30B 29/06 |
| | | | | 117/34 |

(Continued)

FOREIGN PATENT DOCUMENTS

| CN | 102636313 | 12/2014 |
| CN | 207744067 | 8/2018 |

(Continued)

OTHER PUBLICATIONS

PCT International Search Report and Written Opinion in International Appln. No. PCT/US2021/051198, dated Dec. 8, 2021, 16 pages.

*Primary Examiner* — Stefan Gadomski (74) *Attorney, Agent, or Firm* — Fish & Richardson P.C.

(57) ABSTRACT

A temperature monitoring system includes an access port configured to mount to an inspection window of a process heater that includes heating tubulars mounted in an inner volume of the process heater, the access port including at least one visual access portion configured to provide visual access to at least a portion of the heating tubulars; a flange assembly including a bore that extends from a first side configured to mount to the access port to a second side; and a thermal imaging system configured to mount to the second side of the flange assembly, the thermal imaging system including at least one thermal image capture device including a field of view through the bore of the flange of assembly and the at least one visual access portion and into the inner volume of the process heater to capture at least one image of radiation emitted from the heating tubulars.

23 Claims, 4 Drawing Sheets

(56) References Cited

U.S. PATENT DOCUMENTS

| | | | | |
|---|---|---|---|---|
| 5,793,522 A * | 8/1998 | Brun | ............... | G01J 5/0875 359/903 |
| 7,348,562 B2 * | 3/2008 | Irani | ............... | G01J 5/0265 250/339.02 |
| 7,938,576 B1 | 5/2011 | Kychakoff et al. | | |
| 7,956,326 B1 * | 6/2011 | Kychakoff | ............... | G01N 17/008 250/339.01 |
| 8,335,606 B2 | 12/2012 | Mian et al. | | |
| 9,706,137 B2 | 7/2017 | Scanlon et al. | | |
| 9,807,318 B2 | 10/2017 | Ingerhed et al. | | |
| 2004/0259045 A1 * | 12/2004 | Leger | ............... | F23M 5/08 431/8 |
| 2010/0044567 A1 * | 2/2010 | Brandt | ............... | G01J 5/0804 250/334 |
| 2010/0140373 A1 * | 6/2010 | Myhre | ............... | F23R 3/002 239/71 |
| 2010/0329306 A1 * | 12/2010 | Carlson | ............... | G01J 5/041 374/208 |
| 2013/0176418 A1 * | 7/2013 | Pandey | ............... | H04N 5/33 348/E5.09 |
| 2015/0214083 A1 * | 7/2015 | Kawakami | ............... | G01J 5/0875 374/121 |
| 2016/0003471 A1 * | 1/2016 | Karkow | ............... | F23D 14/145 431/189 |
| 2016/0003680 A1 | 1/2016 | Kim et al. | | |
| 2016/0284075 A1 | 9/2016 | Phan et al. | | |
| 2018/0280917 A1 | 10/2018 | Victor et al. | | |
| 2020/0041347 A1 * | 2/2020 | Lautenschläger | ....... | G01J 5/041 |
| 2020/0064288 A1 * | 2/2020 | Cooper | ............... | G01N 15/088 |
| 2020/0149971 A1 * | 5/2020 | Van Laere | ............... | G01J 5/10 |

FOREIGN PATENT DOCUMENTS

| | | |
|---|---|---|
| GB | 2542813 | 4/2017 |
| JP | 2020071211 | 5/2020 |

* cited by examiner

MONITORING TEMPERATURES OF A PROCESS HEATER

TECHNICAL FIELD

This disclosure relates to monitoring temperatures of a process heater and, more particularly, monitoring temperatures of process heaters in an industrial process, such as an acid gas preheater.

BACKGROUND

Process heaters are often used in industrial systems and processes, such as hydrocarbon refining systems as well as other industrial processes. Often, an industrial process includes multiple process heaters in which a fluid to be heated flows through one or more tubulars located within a heating or firebox that is exposed to very high temperatures. As such, the tubulars, which are often made of metal, are exposed to very high temperatures that can alter the material properties and microstructure. Such alteration can lead to permanent damage, and even rupture, due to overheating. Once this damage occurs, there may be considerable loses (for example, economic and time) due to operation interruption and a high cost of fixing the damaged tubulars.

SUMMARY

This disclosure describes implementations of temperature monitoring system for a process heater. In some aspects, the temperature monitoring system includes one or more thermal imaging cameras positionable to capture images (for example, still, or video, or both) of a firebox of a process heater that includes heating tubes mounted therein. The captured images are processed by a control system to determine, for example, locations on the surfaces of the heating tubes that exceed or meet a particular temperature. In some aspects, the control system determines if such locations include material defects due to the excessive temperature.

In an example implementation, a temperature monitoring system includes an access port configured to mount to an inspection window of a process heater that includes a plurality of heating tubulars mounted in an inner volume of the process heater, the access port including at least one visual access portion configured to provide visual access to at least a portion of the plurality of heating tubulars; a flange assembly including a bore that extends from a first side configured to mount to the access port to a second side opposite the first side; and a thermal imaging system configured to mount to the second side of the flange assembly, the thermal imaging system including at least one thermal image capture device including a field of view through the bore of the flange of assembly and the at least one visual access portion and into the inner volume of the process heater to capture at least one image of radiation emitted from the portion of the plurality of heating tubulars.

In an aspect combinable with the example implementation, the first side includes a first flange and the second side includes a second flange.

In another aspect combinable with any of the previous aspects, the first flange is configured to couple to a flanged portion of the access port, and the second flange is configured to couple to a flanged portion of the thermal imaging system.

In another aspect combinable with any of the previous aspects, the thermal imaging system further includes a controller communicably coupled to the at least one thermal imaging device, the controller operable to store the at least one captured image of radiation emitted from the portion of the plurality of heating tubulars.

In another aspect combinable with any of the previous aspects, the controller is configured to process the at least one captured image of radiation emitted from the portion of the plurality of heating tubulars, the processed image including a plurality of pixels, each of the pixels representing an infrared image intensity at a particular surface location of a particular heating tubular of the portion of the plurality of heating tubulars.

In another aspect combinable with any of the previous aspects, each of the pixels represents the infrared image intensity at the particular surface location of the particular heating tubular of the portion of the plurality of heating tubulars defined by at least two dimensions.

In another aspect combinable with any of the previous aspects, the controller is configured to determine a plurality of values associated with the plurality of pixels, each value associated with a particular one of the infrared image intensities of the pixels, and the controller is further configured to determine a greatest value of the plurality of values.

In another aspect combinable with any of the previous aspects, the plurality of values includes a plurality of temperature values.

In another aspect combinable with any of the previous aspects, the controller is configured to determine a defect in at least one of the heating tubulars based at least in part on the determined greatest value of the plurality of values.

In another example implementation, a method for monitoring a temperature of a process heater includes coupling an access port to an inspection window of a process heater that includes a plurality of heating tubulars mounted in an inner volume of the process heater, the access port including at least one visual access portion; coupling a first side of a flange assembly to the access port, the flange assembly including a bore that extends from the first side to a second side opposite the first side; and coupling a thermal imaging system to the second side of the flange assembly, the thermal imaging system including at least one thermal image capture device including a field of view through the bore of the flange of assembly and the at least one visual access portion and into the inner volume of the process heater; and operating the at least one thermal image capture device to capture at least one image of radiation emitted from the portion of the plurality of heating tubulars.

An aspect combinable with the example implementation further includes coupling a first flange of the first side of the flange assembly to a flanged portion of the access port; and coupling a second flange of the second side of the flange assembly to a flanged portion of the thermal imaging system.

Another aspect combinable with any of the previous aspects further includes aligning a centerline of the field of view of the at least one thermal image capture device with a center of the at least one visual access portion of the access port.

Another aspect combinable with any of the previous aspects further includes storing the at least one captured image of radiation emitted from the portion of the plurality of heating tubulars.

Another aspect combinable with any of the previous aspects further includes processing the at least one captured image of radiation emitted from the portion of the plurality of heating tubulars.

In another aspect combinable with any of the previous aspects, the processed image includes a plurality of pixels.

In another aspect combinable with any of the previous aspects, each of the pixels represents an infrared image intensity at a particular surface location of a particular heating tubular of the portion of the plurality of heating tubulars.

In another aspect combinable with any of the previous aspects, each of the pixels represents the infrared image intensity at the particular surface location of the particular heating tubular of the portion of the plurality of heating tubulars defined by at least two dimensions.

Another aspect combinable with any of the previous aspects further includes determining a plurality of values associated with the plurality of pixels, each value associated with a particular one of the infrared image intensities of the pixels; and determining a greatest value of the plurality of values.

In another aspect combinable with any of the previous aspects, the plurality of values includes a plurality of temperature values.

Another aspect combinable with any of the previous aspects further includes determining a defect in at least one of the heating tubulars based at least in part on the determined greatest value of the plurality of values.

In another example implementation, a system includes a door that includes a window, the door configured to mount to an inspection port of an acid gas preheater that includes a plurality of heating tubes mounted in a firebox of the acid gas preheater; a thermal camera coupled to the door, the thermal camera including a focal point aligned with at least one of a center of the window or a center of the inspection port; and a control system communicably coupled to the thermal camera. The control system is configured to perform operations including operating the thermal camera to capture at least one thermal image of at least a portion of the plurality of heating tubes; processing the captured thermal image into a graphical representation of the thermal image, the graphical representation including a plurality of thermal values associated with a plurality of discrete surface locations of the portion of the plurality of heating tubes; and presenting the graphical representation of the thermal image on a graphical user interface (GUI) communicably coupled to the control system.

An aspect combinable with the example implementation further includes a flange assembly coupled between the door and the thermal camera, the flange assembly including a bore that includes a centerline aligned with at least one of the center of the window or the center of the inspection port.

In another aspect combinable with any of the previous aspects, the control system is configured to perform operations further including determining that at least one of the plurality of thermal values associated with the plurality of discrete surface locations of the portion of the plurality of heating tubes exceeds a threshold value.

In another aspect combinable with any of the previous aspects, the control system is configured to perform operations further including determining a particular surface location associated with the at least one thermal value that exceeds the threshold value; and detecting a defect at the particular surface location.

In another aspect combinable with any of the previous aspects, the control system is configured to perform operations further including displaying the detected defect on the GUI.

Implementations of a temperature monitoring system according to the present disclosure can include one or more of the following features. For example, example embodiments of a temperature monitoring system according to the present disclosure can enable industrial plants to continuously monitor the temperature of heating tubes inside fired heaters. As another example, example embodiments of a temperature monitoring system according to the present disclosure can provide accurate and reliable temperature or radiation measurement, which is currently unavailable in conventional monitoring systems for process heaters. As another example, example embodiments of a temperature monitoring system according to the present disclosure can provide for notification for industrial plant operators of any overheated heating tubes to enable timely corrective action to be taken prior to tube rupture (or failure or other damage).

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1:
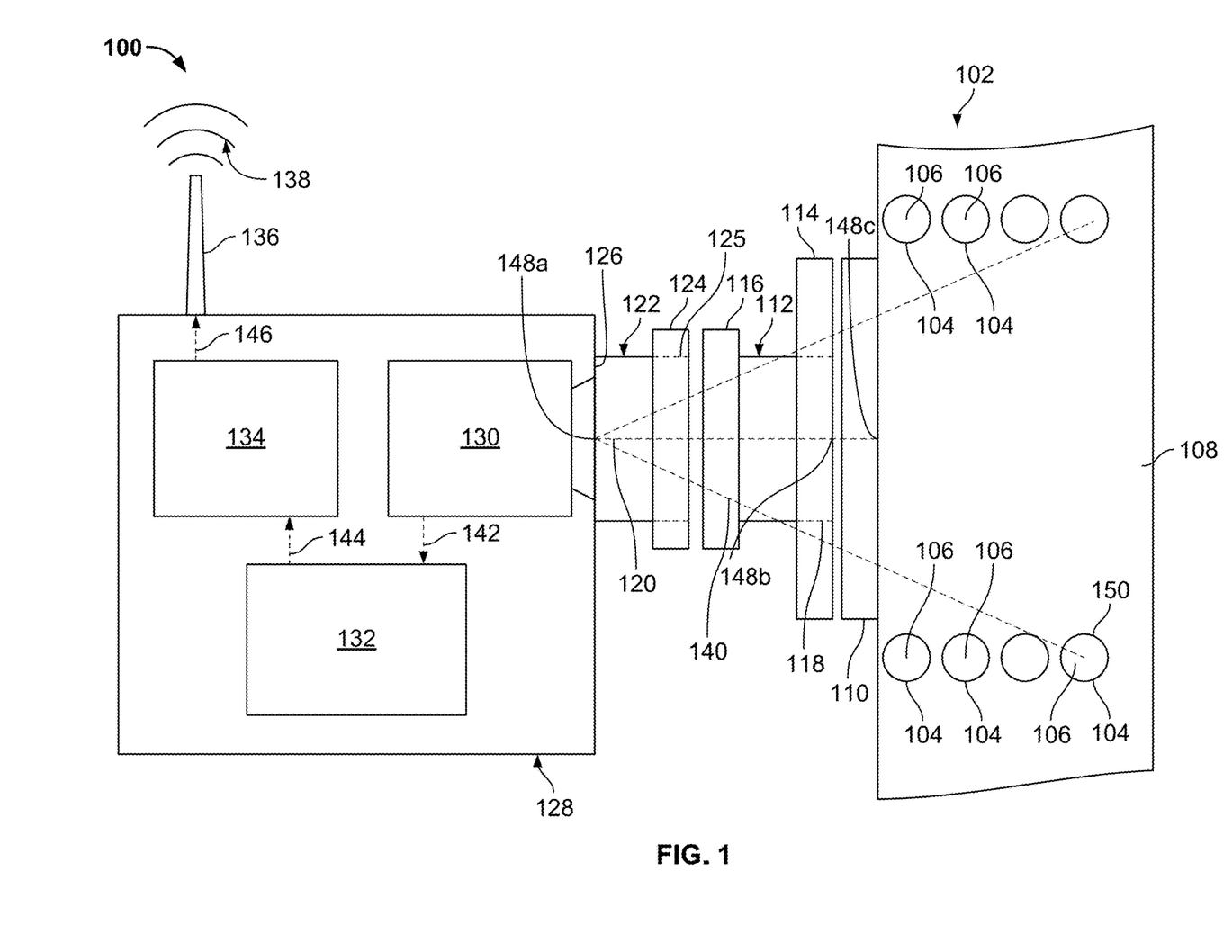
FIG. 1 is a schematic diagram of an example implementation of a temperature monitoring system for a process heater according to the present disclosure.

FIG. 1 is a schematic diagram of an example implementation of a temperature monitoring system 100 for a process heater 102 according to the present disclosure. In some aspects, temperature monitoring system 100 is operable to continuously monitor temperatures of a material or equipment inside the process heater 102. For example, the process heater 102 shown in this example implementation can be or include an acid gas preheater as part of a natural gas processing plant, where process heaters can be essential equipment. Other examples of process heaters 102 include, for instance, air preheaters, boilers, auxiliary burners, and other combustion-fired heaters. As an acid gas preheater, the process heater 102 is a type of process heater in which an acid gas 106 flows inside metal tubes 104 (also called heating tubes or heating tubulars) located in a firebox (or volume) 108 and is heated prior to flowing to a reaction furnace as a step to improve the combustion and reaction process within the natural gas processing plant. In some aspects, the heating tubes 104 are exposed to very high temperatures that can alter the material properties and microstructure and can lead to permanent damage if overheated. Such damage may lead to considerable loses due to operation interruption as well as the high cost of fixing the damaged tubes 104.

In this example, the process heater 102 includes an inspection window 110 that is mounted (for example, permanently or semi-permanently) to a housing of the process heater 102. In some aspects, the inspection window 110 provides for visual access to the firebox 108 of the process heater 102. Such visual access (for example, human visual access) may allow for a cursory viewing of the heating tubes 104 (and view of a burner flame) but, in some aspects, does not allow for the determination of defects, including microstructural defects, within the heating tubes 104. Nor does the inspection window 110 allow for determination of one or more thermal attributes (for example, temperature) of the heating tubes 104.

This example implementation of the temperature monitoring system 100 also includes a access port 112. In some aspects, the access port 112 is or includes a door that is pivotally mounted (for example, by a hinged connection 114) to the inspection window 110. In some aspects, the access port 112 includes a visual access portion 118 that provides for visual access to the inspection window 110 through the access port 112. Opposite the visual access portion 112B is a connector 116. In some aspects, the connector 116 is or includes a flanged connection that includes multiple bolt locations to which a flange assembly 122 can be mounted.

The flange assembly 122, as shown, includes a connector 124 that is mountable to the connector 116. In some aspects, like the connector 116, the connector 124 is or can include a flanged connection with matching bolt locations. Although this example implementation includes or uses flanged connections, one or more of such connections can be other forms of mechanical connectors, such as welds, a groove and coupling connections, soldering, brazing, adhesive, or otherwise). A bore 125 extends through the flange assembly 122 between the connector 124 and a connector 126 that is mountable to a thermal imaging system 128. In some aspects, the connector 126 also includes a flanged (or other form) connector that rigidly couples the thermal imaging system 128 to the process heater 102 through the flange assembly 122, the access port 112, and the inspection window 110.

As there may be many different sizes of inspection windows 110 for different types (and sizes) of process heaters 102 in an industrial process, there can also be many different sizes of hinged connections 114 to mate with the different inspection windows 110. Although there can be differently sized hinged connections, each access port 112 can include a standard (or single) sized connector 116. There can also be a standard (or single) sized flange assembly (for example, standard size connectors 124 and 126). Thus, the thermal imaging system 128 can be mountable to many different process heaters 102 simply by adjusting a size of the hinged connection 114 (or selecting a particular access port 112 with a particularly sized hinged connection 114).

In this example, the thermal imaging system 128 include a thermal imaging device 130 (or devices 130), such as a thermal imaging camera (still or video). As shown in this example, the thermal imaging device 130 is positioned so that a center 148a of a field of view 140 (for example, a center of a lens of the device 130) is aligned with an axis 120 that extend through the bore 125 of the flange assembly 122, through a center 148b (for example, radial center) of the visual access portion 118 of the access port 112, and through a center 148c (for example, radial center) of the inspection window 110. In some aspects, rigid connection of the thermal imaging system 128 to the process heater 102 through the flange assembly 122 and the access port 112 aligns the centers 148a, 148b, and 148c along the axis 120 to, for example, ensure a widest field of view 140 of the thermal imaging device 130 into the firebox 108 of the process heater 102. As shown in this example, one or more heating tubes 104 are within the field of view 140 of the thermal imaging device 130.

In this example, the thermal imaging system 128 also includes a controller 132 (such as a microprocessor based controller that includes one or more hardware processors and one or more memory modules) that is communicably coupled to receive data from and provide instructions (for example, commands) (collectively, communications 142) the thermal imaging device 130. In some aspects, the controller 132 can be operated automatically, such as by encoded software instructions stored on the controller 132, to operate the thermal imaging device 130 (through communications 142). In some aspects, the controller 132 can be operated automatically, such as by encoded software instructions stored on a backend server communicably coupled to the controller 132, to operate the thermal imaging device 130 (through communications 142). In some aspects, the controller 132 can be operated by a human operator to operate the thermal imaging device 130 (through communications 142). Data generated by the thermal imaging device 130, such as one or more images (for instance, thermal radiation) captured by the thermal imaging device 130 can be sent through communications 142 to the controller 132, such as for further processing and transmission from the thermal imaging system 128.

The example implementation of the thermal imaging system 128 also includes a communications interface 134 that is communicably coupled to the controller 132. As shown in this example, communications 144 (for example, data between the controller 132 and the communications interface 134 and/or commands between the controller 132 and the communications interface 134) can be passed between these components of the thermal imaging system 128. Further, the communications interface 134 is communicably coupled to a wireless antenna 136 such that communications 146 (for example, data between the communications interface 134 and the wireless antenna 136 and/or commands between the communications interface 134 and the wireless antenna 136). Wireless communications 138 can be transmitted between the thermal imaging system 128 and, for example, a backend server communicably coupled to the thermal imaging system 128. In some aspects, the wireless communications 138 can include data (for example, one or more captured thermal images from the thermal imaging device 130) sent from the thermal imaging system 128 or operational commands sent to the thermal imaging system 128 (for example, to operate the thermal imaging device 130).

In an example operation of the temperature monitoring system 100, the thermal imaging system 128 (and more particularly, the thermal imaging device 130) is coupled (for example, rigidly) to the inspection window 110 of the process heater 102, such as through the flange assembly 122 and the access port 112. In some aspects, the coupling includes connecting one or more flanged connections between the thermal imaging system 128 and the process heater 102. In some aspects, by coupling the thermal imaging system 128 to the process heater 102 through the flange assembly 122 and the access port 112, the centers 148a, 148b, and 148c are aligned on the axis 120 to ensure the largest field of view 140 for the thermal imaging device 130.

Once coupled, the thermal imaging device 130 can be operated (for example, by a human operator through the controller 132 or automatically with the controller 132) to capture one or more thermal images of one or more heating tubes 104 within the firebox 108 of the process heater 102.

In some aspects, the captured images can be still images or moving video images. In some aspects, the captured images can be taken periodically, such as, for example, every 1 second (or other period). In some example aspects, each captured image is an infrared radiation image of the one or more heating tubes 104 within the firebox 108 of the process heater 102.

In some aspects, each of the captured images from the thermal imaging device 130 can be processed by the thermal imaging device 130, the controller 132, or both working in combination (for example, by one or more software algorithms encoded in software instructions on the controller 132). Processing can include, for example, upsizing or downsizing the captured image. Processing can also include, for example, interpreting or modifying particular colors or shades of colors within the captured images to correspond to a particular radiation emissivity, temperature, or other criteria associated with the thermal energy within the firebox 108 and/or the heating tubes 104. Processing can also include, for example, assigning or determining one or more dimensional axis (such as two dimensions or three dimensions) to the captured image for a later determination of one or more specific locations within the captured image. In some aspects, the processing includes pixelating, or separating or determining the pixels within the captured image in order to later identify one or more specific locations (as defined by one or more pixels) within the captured image. Such pixelating can also include separating or eliminating pixels that do not represent certain portions of the captured image, such as pixels that do not represent heating tubes, from the captured image. Processing can also include, in some aspects, storing the captured (or processed) image in the controller 132.

Figure 2:
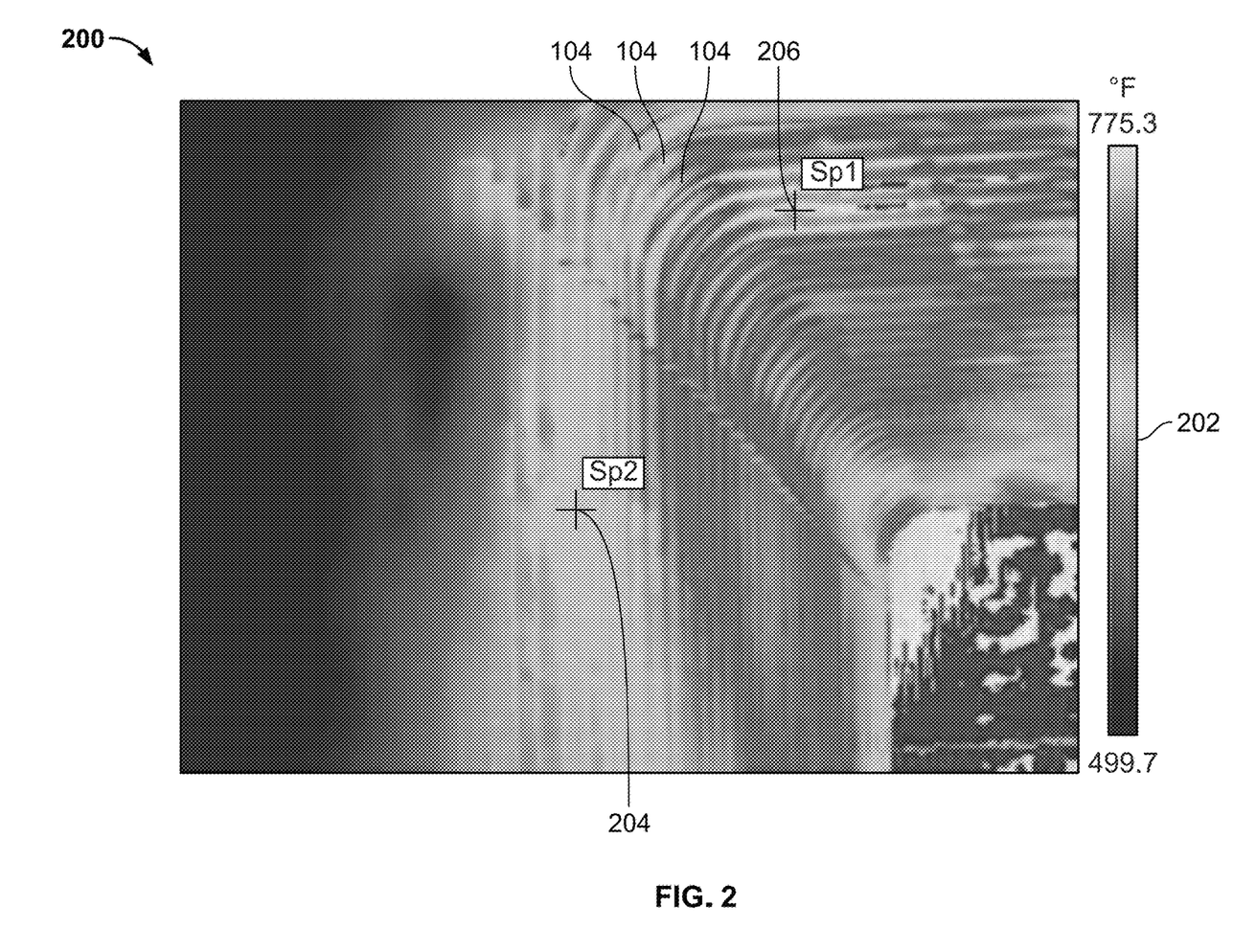
FIG. 2 is a temperature map generated by a temperature monitoring system for a process heater according to the present disclosure.

FIG. 2 illustrates a temperature map 200 generated by the temperature monitoring system 100 for the process heater 102. In some aspects, temperature map 200 represents the captured image or a processed captured image from the thermal imaging device 130 (for example, processed by the controller 132). As shown in this example, the temperature map 200 shows an image of heating tubes 104 within the firebox 108 of the process heater 102 at a range of temperatures between almost 500° F. and 775° F. as shown on scale 202 (although temperature levels are not limited to such a range).

For example, in some aspects, each pixel of the temperature map 200 represents infrared radiation emissivity (temperature level) and has a coordinate (x, y). For each captured image, pixels that do not belong to the heating tubes 104 can be eliminated (for example, in the processing). As the thermal imaging device 130 may always be fixed, each captured image show the same heating tube locations; accordingly, if there are 50 heating tubes 104 in the image as an example, there will be 50 groups of pixel coordinates and each group represents one heating tube 104.

Specific locations 204 and 206 are shown in the temperature map 200 and can represent, for example, locations at which a surface of a particular heating tube 104 has reached or exceeded a threshold temperature or, alternatively, is at a maximum determined temperature within the map 200. For example, during operation of the temperature monitoring system 100, the controller 132 can process the captured image and determine one or more locations (for example, defined in two dimensions) in which a temperature or infrared radiation meets or exceeds a threshold value. In such cases, the threshold value can represent a temperature or infrared radiation amount that causes or can cause structural damage to the heating tube 104. As another example, during operation of the temperature monitoring system 100, the controller 132 can process the captured image and determine one or more locations (for example, defined in two dimensions) in which a maximum temperature or maximum infrared radiation occurs. In such cases, such maximum values can inform the controller 132 or a human operator of heat that can cause structural damage to the heating tube 104. The captured image, or processed image, or both, can be transmitted through the wireless communications 136 by the thermal imaging system 128, such as to a backend server system communicably coupled to the thermal imaging system 128.

In a specific example, a highest temperature (or radiation emissivity) value measured (for example, highest pixel intensity) of each captured image can be determined and, in some aspects, transmitted through the communication interface 134 (for example, following an applicable industrial communication protocol such as HART) to a Distributed Control System (DCS) of an industrial plant that includes the process heater 102. In some cases, the DCS has a predefined high temperature alarm set-point configured, and if the received temperature value in the DCS is higher than the set-point, an alarm can be initiated, which will be reported by a human operator. Subsequently, a maintenance crew can access the controller 132 to identify the affected heating tubes 104. In some aspects, the controller 132 can indicate the affected heating tubes 104 based on their related group of pixels and temperature values exceeding the acceptable limit.

Figure 3:
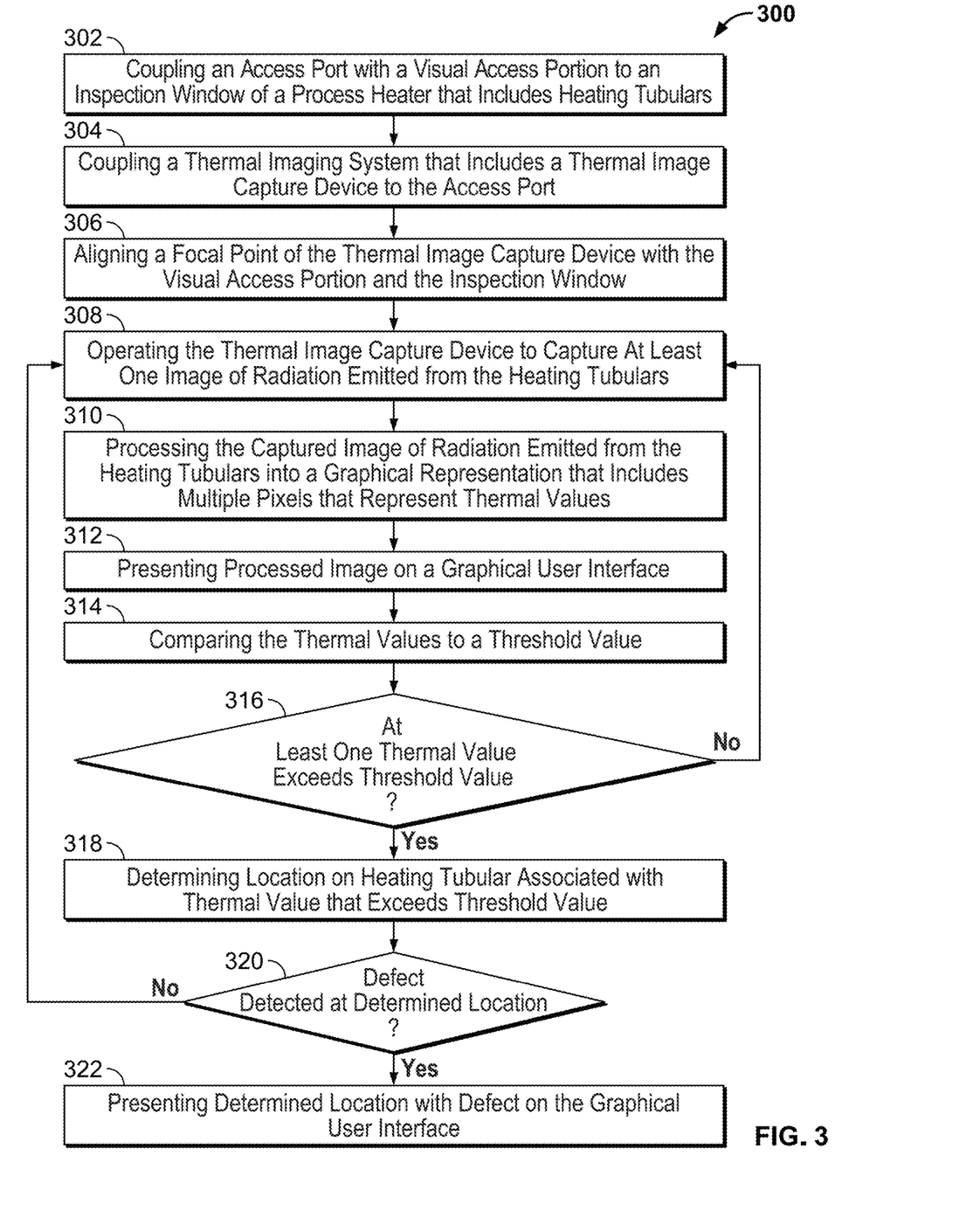
FIG. 3 illustrates a flowchart of an example method of operation of a temperature monitoring system for a process heater according to the present disclosure.

FIG. 3 illustrates a flowchart of an example method 300 of operation of a temperature monitoring system for a process heater according to the present disclosure. In some aspects, method 300 can be performed by or with the temperature monitoring system 100 shown in FIG. 1. Method 300 can begin at step 302, which includes coupling an access port with a visual access portion to an inspection window of a process heater that includes heating tubulars. For example, as shown in FIG. 1, a particular access port (or door) 112 can be coupled to an inspection window 110 of the process heater 102. In some aspects, the particular access port 112 can be chosen to match a size (for example, perimeter, diameter, or otherwise) of the inspection window 110. In some aspects, the access port 112 is mounted to the inspection window 110 through a hinged connection 114.

Method 300 can continue at step 304, which includes coupling a thermal imaging system that includes a thermal image capture device to the access port. For example, thermal imaging system 128 is coupled (for example, rigidly) to the access port 112 through, in some examples, the flange assembly 122. In some aspects, flanged connectors 124 and 126 of the flange assembly 122 can be coupled (for example, through bolts, gaskets, and nuts) to the access port 112 and thermal imaging system 128, respectively.

Method 300 can continue at step 306, which includes aligning a focal point of the thermal image capture device with the visual access portion and the inspection window. For example, in some aspects, the alignment of the thermal image capture device with the visual access portion and the inspection window can occur automatically by rigidly coupling the thermal imaging system 128 to the access port 112 (and also the inspection window 110). For example, in some aspects, once rigidly coupled, centers 148a, 148b, and 148c are aligned by the rigid coupling, as well as aligned on axis 120 that extends from, for instance, a center of the lens of the thermal imaging device 130 (center 148a), through the bore 125, through the visual access portion 118, and to the inspection window 110. Once aligned, the field of view 140 of the thermal imaging device 130 (which includes the focal point) can be optimized for capturing images of the firebox 108 and heating tubes 104 of the process heater 102. In some aspects, there can be further adjustment of one or more of the thermal imaging system 128, the flange assembly 122, or the access port 112 in order to align the focal point of the thermal image capture device with the visual access portion and the inspection window.

Method 300 can continue at step 308, which includes operating the thermal image capture device to capture at least one image of radiation emitted from the heating tubulars. For example, thermal imaging device 130 can be operated, for example by the controller 132, a remote computing system communicably coupled to the controller 132, or a human operator, to capture at least one image of the radiation emitted from the heating tubulars 104. In some aspects, the thermal imaging device 130 is operated periodically, for example, every 1 second or at another period, to capture multiple images (still, video, or both).

Method 300 can continue at step 310, which includes processing the captured image of radiation emitted from the heating tubulars into a graphical representation that includes multiple pixels that represent thermal values. For example, in some aspects, the thermal imaging device 130 and/or the controller 132 can operate to produce a temperature map of the captured image, such as temperature map 200 shown in FIG. 2. In some aspects, the temperature map is in color, with a spectrum of colors representing a lowest recorded temperature up to a highest recorded temperature.

In some aspects, step 310 can also include other forms of processing. For example, the captured image can be upsized or downsized (for example, in definition or clarity. One or more dimensional axis (such as two dimensions or three dimensions) can be added or assigned to the captured image for a later determination of one or more specific locations within the captured image. Pixels within the captured image can be separated in order to later identify one or more specific locations (as defined by one or more pixels) within the captured image. Some pixels that do not represent certain portions of the captured image, such as pixels that do not represent heating tubes, can be separated or eliminated from the captured image.

Method 300 can continue at step 312, which includes presenting the processed image on a graphical user interface (GUI). For example, the graphical representation, such as the temperature map 200 shown in FIG. 2, could be presented by the controller 132, either at a GUI of the thermal imaging system 128 or a backend system communicably coupled to the thermal imaging system 128 through communications 138. In some aspects, step 312 (or another step) can also include storing the captured or processed image (or both if different) on the thermal imaging system 128 or at the backend system.

Method 300 can continue at step 314, which includes comparing the thermal values to a threshold value. For example, in some aspects, the controller 132 calculates, from the processed or captured image, a thermal value for each pixel on the image. The thermal value can be a temperature or an amount of heat energy or radiation or another value that represents an amount of thermal energy present in the firebox 108 (and, more specifically, at a surface location of a particular heating tube 104) at that pixel location. In some aspects, the threshold value can be adjustable. In some aspects, the threshold value represents a maximum value before structural damage (for example, microcracks or other defect) occurs to a heating tube 104.

Method 300 can continue at step 316, which includes determining whether at least one thermal value exceeds a threshold value. Step 316 can also (or alternatively) include determining a maximum thermal value present in the processed or captured image. For example, if no thermal value at any particular pixel exceeds the threshold value (a "no" determination), then method 300 can revert to step 308 from step 316. If a thermal value at any particular pixel exceeds the threshold value (a "yes" determination), then method 300 can continue at step 318, which includes determining a location on a heating tubular associated with the thermal value that exceeds the threshold value (and/or the location on a heating tubular associated with a maximum thermal value recorded in the image). For example, as the controller 132 has determined an excessive thermal value at a particular pixel, the controller 132 can identify or calculate a multi-dimensional (for example, two dimensions or three dimensions) location, for instance, on a particular heating tube 104, that corresponds to the identified or calculated location. In some aspects, one or both of steps 316 or 318 include the controller 132 (and, more generally, the thermal imaging system 128) notifying a backend system, such as an industrial plant DCS, of the determination of the excessive (or maximum) thermal value, the location of the excessive (or maximum) thermal value, or both.

Method 300 can continue at step 320, which includes determining whether a defect is detected at the determined location. For example, a surface location of a particular heating tube 104 at which the excessive (or maximum) thermal value is determined can have a defect 150 due to the excessive thermal energy (for example, temperature) at that location. In some aspects, if the thermal value at the particular location exceeds the threshold value, then the defect 150 can be presumed according to known material thermal failure characteristics of the particular heating tube 104. In some aspects, the controller 132 can determine that the defect 150 has occurred due to the particular location having exceeded the threshold value for a minimum time duration as determined by multiple, sequential images captured during the minimum time duration.

Method 300 can continue at step 322, which includes presenting the determined location with the defect on the graphical user interface. For example, in some aspects, a graphical representation or notice of the determined defect can be presented by the controller 132, either at a GUI of the thermal imaging system 128 or a backend system communicably coupled to the thermal imaging system 128 through communications 138. In some aspects, step 322 can also include storing the determination of the defect on the thermal imaging system 128 or at the backend system.

Figure 4:
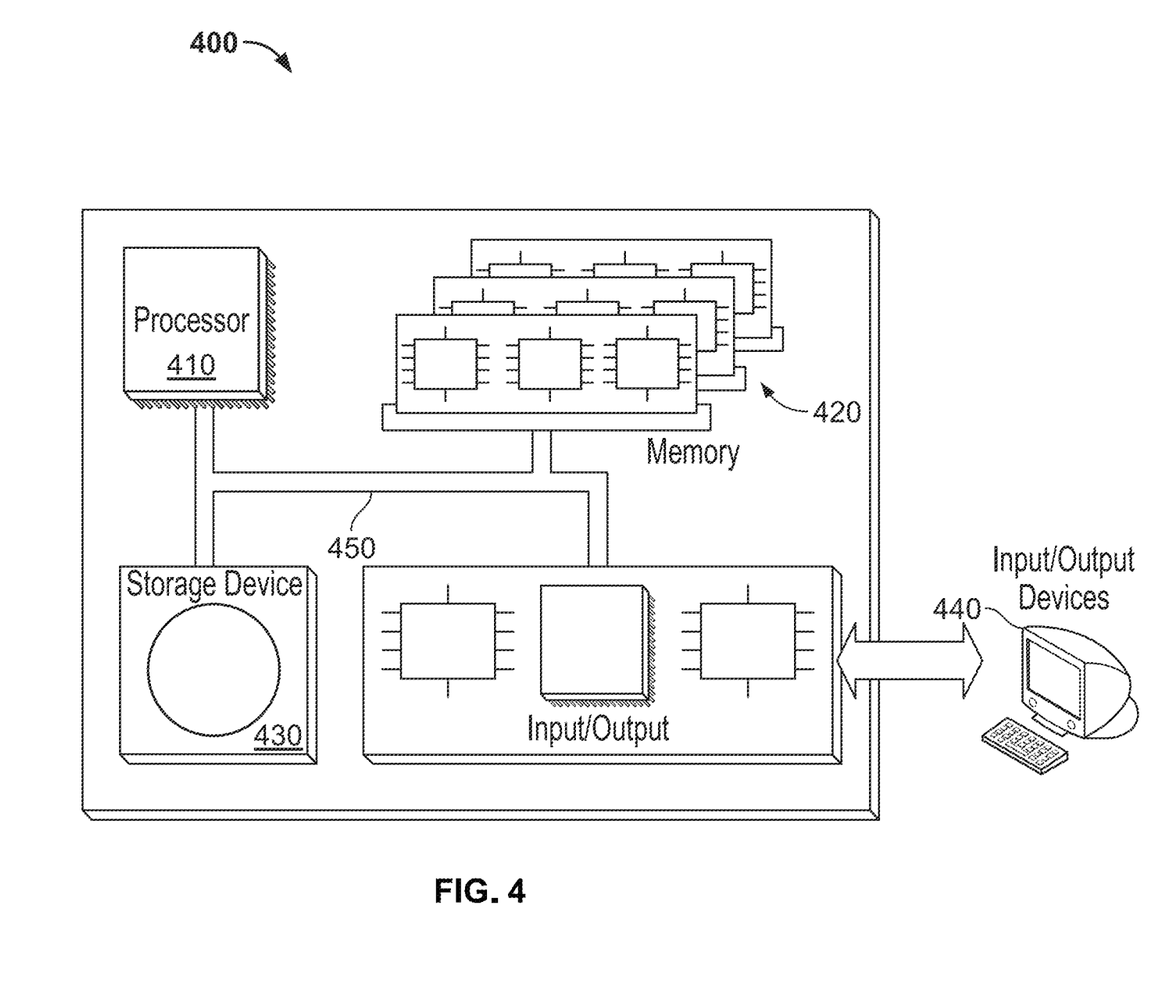
FIG. 4 is a schematic illustration of an example controller (or control system) for controlling operations of a temperature monitoring system for a process heater according to the present disclosure.

FIG. 4 is a schematic illustration of an example controller 400 (or control system) for controlling operations of a temperature monitoring system for a process heater according to the present disclosure. For example, the controller 400 can include or be part of the thermal imaging system 128 shown in FIG. 1, such as, for example, all or part of the controller 132 and the communication interface 144. The controller 400 is intended to include various forms of digital computers, such as printed circuit boards (PCB), processors, digital circuitry, or otherwise parts of a temperature monitoring system. Additionally the system can include portable storage media, such as, Universal Serial Bus (USB) flash drives. For example, the USB flash drives can store operating systems and other applications. The USB flash drives can include input/output components, such as a wireless transmitter or USB connector that can be inserted into a USB port of another computing device.

The controller 400 includes a processor 410, a memory 420, a storage device 430, and an input/output device 440. Each of the components 410, 420, 430, and 440 are interconnected using a system bus 450. The processor 410 is capable of processing instructions for execution within the controller 400. The processor can be designed using any of a number of architectures. For example, the processor 410 can be a CISC (Complex Instruction Set Computers) processor, a RISC (Reduced Instruction Set Computer) processor, or a MISC (Minimal Instruction Set Computer) processor.

In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the controller 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the controller 400. In one implementation, the storage device 430 is a computer-readable medium. In various different implementations, the storage device 430 can be a floppy disk device, a hard disk device, an optical disk device, or a tape device.

The input/output device 440 provides input/output operations for the controller 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as an LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A temperature monitoring system, comprising:
an access port configured to mount to an inspection window of a process heater that comprises a plurality of heating tubulars mounted in an inner volume of the process heater, the access port comprising at least one visual access portion configured to provide visual access to at least a portion of the plurality of heating tubulars;
a flange assembly comprising a bore that extends from a first side configured to mount to the access port to a second side opposite the first side; and
a thermal imaging system configured to mount to the second side of the flange assembly, the thermal imaging system comprising at least one thermal image capture device comprising a field of view through the bore of the flange of assembly and the at least one visual access portion and into the inner volume of the process heater to capture at least one image of radiation emitted from the portion of the plurality of heating tubulars,
wherein the access port comprises a rigid connection between the flange assembly and the thermal imaging device such that, when rigidly connected therebetween, respective radial centers of the thermal image capture device, the at least one visual access portion, and the inspection window are aligned on a common axis to maximize a width of the field of view.

2. The temperature monitoring system of claim 1, wherein the first side comprises a first flange and the second side comprises a second flange.

3. The temperature monitoring system of claim 2, wherein the first flange is configured to couple to a flanged portion of the access port, and the second flange is configured to couple to a flanged portion of the thermal imaging system.

4. The temperature monitoring system of claim 1, wherein the thermal imaging system further comprises a controller communicably coupled to the at least one thermal imaging device, the controller operable to store the at least one captured image of radiation emitted from the portion of the plurality of heating tubulars.

5. The temperature monitoring system of claim 4, wherein the controller is configured to process the at least one captured image of radiation emitted from the portion of the plurality of heating tubulars, the processed image comprising a plurality of pixels, each of the pixels representing an infrared image intensity at a particular surface location of a particular heating tubular of the portion of the plurality of heating tubulars.

6. The temperature monitoring system of claim 5, wherein each of the pixels represents the infrared image intensity at the particular surface location of the particular heating tubular of the portion of the plurality of heating tubulars defined by at least two dimensions.

7. The temperature monitoring system of claim 5, wherein the controller is configured to determine a plurality of values associated with the plurality of pixels, each value associated with a particular one of the infrared image intensities of the pixels, and the controller is further configured to determine a greatest value of the plurality of values.

8. The temperature monitoring system of claim 7, wherein the plurality of values comprises a plurality of temperature values.

9. The temperature monitoring system of claim 7, wherein the controller is configured to determine a defect in at least one of the heating tubulars based at least in part on the determined greatest value of the plurality of values.

10. A method for monitoring a temperature of a process heater, comprising:
coupling an access port to an inspection window of a process heater that comprises a plurality of heating tubulars mounted in an inner volume of the process heater, the access port comprising at least one visual access portion;
coupling a first side of a flange assembly to the access port, the flange assembly comprising a bore that extends from the first side to a second side opposite the first side;
coupling a thermal imaging system to the second side of the flange assembly, the thermal imaging system comprising at least one thermal image capture device comprising a field of view through the bore of the flange of assembly and the at least one visual access portion and into the inner volume of the process heater, wherein the coupling of the thermal imaging system to the second side of the flange assembly and coupling of the first side of the flange assembly to the access port that is coupled to the inspection window aligns respective radial centers of the thermal image capture device, the at least one visual access portion, and the inspection window on a common axis to create a rigid connection between the flange assembly and the thermal imaging device to maximize a width of the field of view; and
operating the at least one thermal image capture device to capture at least one image of radiation emitted from the portion of the plurality of heating tubulars.

11. The method of claim 10, further comprising:
coupling a first flange of the first side of the flange assembly to a flanged portion of the access port; and
coupling a second flange of the second side of the flange assembly to a flanged portion of the thermal imaging system.

12. The method of claim 10, wherein the rigid connection aligns a centerline of the field of view of the at least one thermal image capture device with the radial center of the at least one visual access portion of the access port.

13. The method of claim 10, further comprising storing the at least one captured image of radiation emitted from the portion of the plurality of heating tubulars.

14. The method of claim 13, further comprising processing the at least one captured image of radiation emitted from the portion of the plurality of heating tubulars, the processed image comprising a plurality of pixels, each of the pixels representing an infrared image intensity at a particular surface location of a particular heating tubular of the portion of the plurality of heating tubulars.

15. The method of claim 14, wherein each of the pixels represents the infrared image intensity at the particular surface location of the particular heating tubular of the portion of the plurality of heating tubulars defined by at least two dimensions.

16. The method of claim 14, further comprising:
determining a plurality of values associated with the plurality of pixels, each value associated with a particular one of the infrared image intensities of the pixels; and
determining a greatest value of the plurality of values.

17. The method of claim 16, wherein the plurality of values comprises a plurality of temperature values.

18. The method of claim 16, further comprising determining a defect in at least one of the heating tubulars based at least in part on the determined greatest value of the plurality of values.

19. A system, comprising:
- a door that comprises a window, the door configured to mount to an inspection port of an acid gas preheater that comprises a plurality of heating tubes mounted in a firebox of the acid gas preheater;
- a thermal camera coupled to the door, the thermal camera comprising a focal point aligned with at least one of a center of the window or a center of the inspection port;
- a flange assembly coupled between the door and the thermal camera, the flange assembly comprising a bore that comprises a centerline aligned with the respective centers of the window and the center of the inspection port to maximize a field of view of a lens of the thermal camera into the firebox of the acid gas heater; and
- a control system communicably coupled to the thermal camera, the control system configured to perform operations comprising:
  - operating the thermal camera to capture at least one thermal image of at least a portion of the plurality of heating tubes;
  - processing the captured thermal image into a graphical representation of the thermal image, the graphical representation comprising a plurality of thermal values associated with a plurality of discrete surface locations of the portion of the plurality of heating tubes; and
  - presenting the graphical representation of the thermal image on a graphical user interface (GUI) communicably coupled to the control system.

20. The system of claim 19, wherein the control system is configured to perform operations further comprising determining that at least one of the plurality of thermal values associated with the plurality of discrete surface locations of the portion of the plurality of heating tubes exceeds a threshold value.

21. The system of claim 20, wherein the control system is configured to perform operations further comprising:
- determining a particular surface location associated with the at least one thermal value that exceeds the threshold value; and
- detecting a defect at the particular surface location.

22. The system of claim 21, wherein the control system is configured to perform operations further comprising displaying the detected defect on the GUI.

23. The system of claim 19, wherein the door comprises a hinged connection that is configured to attach to the inspection port.

* * * * *